United States Patent
Lee

(10) Patent No.: US 6,756,718 B2
(45) Date of Patent: Jun. 29, 2004

(54) POSITIONING STRUCTURE FOR AIR FAN INDUCTION ELEMENT AND STATOR

(76) Inventor: Bill Lee, No. 148, Tai-Ho Rd., Chu-Pei City, Hsinchu Hsien (TW)

( * ) Notice: Subject to any disclaimer, the term of this patent is extended or adjusted under 35 U.S.C. 154(b) by 141 days.

(21) Appl. No.: 09/876,097

(22) Filed: Jun. 8, 2001

(65) Prior Publication Data

US 2002/0185931 A1 Dec. 12, 2002

(51) Int. Cl.$^7$ ................................................ H02K 1/12
(52) U.S. Cl. ......................... 310/254; 310/68 R; 29/596
(58) Field of Search ............................ 310/68 R, 254, 310/164; 29/596

(56) References Cited

U.S. PATENT DOCUMENTS

| | | | |
|---|---|---|---|
| 3,742,267 A | * 6/1973 | Papst et al. | 310/168 |
| 4,429,263 A | * 1/1984 | Muller | 310/68 R |
| 4,547,714 A | * 10/1985 | Muller | 310/68 R |
| 4,910,420 A | * 3/1990 | Hoover et al. | 29/596 |
| 5,093,599 A | * 3/1992 | Horng | 310/194 |
| 5,245,236 A | * 9/1993 | Horng | 310/67 R |
| 5,574,321 A | * 11/1996 | Baker | 310/42 |
| 5,967,763 A | * 10/1999 | Horng | 310/68 R |
| 6,109,892 A | * 8/2000 | Horng | 310/254 |
| 6,114,785 A | * 9/2000 | Horng | 310/164 |
| 6,407,473 B1 | * 6/2002 | Horng et al. | 310/164 |

* cited by examiner

*Primary Examiner*—Joseph Waks
(74) *Attorney, Agent, or Firm*—Birch, Stewart, Kolasch & Birch, LLP

(57) ABSTRACT

A positioning structure for air fan induction element and stator is capable of precisely positioning an air fan induction element and a stator in an air fan. The induction element is located at a desired position on a circuit board. The position is defined by a circle center coincided with the center of a shaft opening of the circuit board, and a zone defined by a base line ±10 degrees (for quadruple-pole stators), with the base line formed by intersecting the circuit board with an equipartition plane of a front end and a rear end of two neighboring and opposing pole struts, or a zone defined by a base line ±5 degrees (for octonary-pole stators), with the base line formed by intersecting the circuit board with the equipartition plane of the front pole end of an upper pole sheet and the rear pole end of a lower pole sheet. The structure is simple and can position the induction element precisely, thereby improves electric current, air pressure and air flow rate and rotation speed of the air fan and increases air fan durability.

8 Claims, 6 Drawing Sheets

US 6,756,718 B2

POSITIONING STRUCTURE FOR AIR FAN INDUCTION ELEMENT AND STATOR

BACKGROUND OF THE INVENTION

This invention relates to a positioning structure for an air fan induction element and stator, and particularly a positioning structure that is capable of precisely positioning an air fan induction element and a stator (either a quadruple-pole stator or an octonary-pole stator) for improving electric current, air pressure and air flow rate and rotation speed of the air fan and increasing air fan durability.

Air fans are being widely used in modem electronic products. The main reason is that integration of electronic products has been enhanced to a very high degree, and a great number of electronic components may be clustered on a very small circuit board.

Air fans generally have a simple structure and a compact size, and can be produced in large quantity at a great efficiency. Hence they have high demands in the electronic industry. Eventually, air fan has become an indispensable element in many electronic products.

Although the electronic elements are small size and consume a little energy, when using for a long period of time the generated heat will accumulate and is difficult to disperse. As a result, the function and performance of the electronic elements will be downgraded, and their durability will also suffer.

The presently positioning of electronic elements and stator in the air fans is not very precise, such as a prior art. It has an excess deviation angle. When the positioning of the electronic elements and stator is not precise, it could cause excess fluctuation in electric current, air pressure, air flow rate and air fan rotation speed, and could result in not stable performance of the air fans and decrease the air fans durability.

SUMMARY OF THE INVENTION

The primary object of this invention is to resolve the foregoing disadvantages. This invention aims at providing a structure for precisely positioning the induction element, for quadruple-pole stators or octonary-pole stators, thereby to improve electric current, air pressure and air flow rate and rotation speed of the air fan and to increase air fans durability.

Another object of this invention is to provide vertical or horizontal mounting induction elements to accommodate the air fans of different specifications.

The foregoing, as well as additional objects, features and advantages of this invention will be more readily apparent from the following detailed description, which proceeds with reference to the accompanying drawings.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 5:
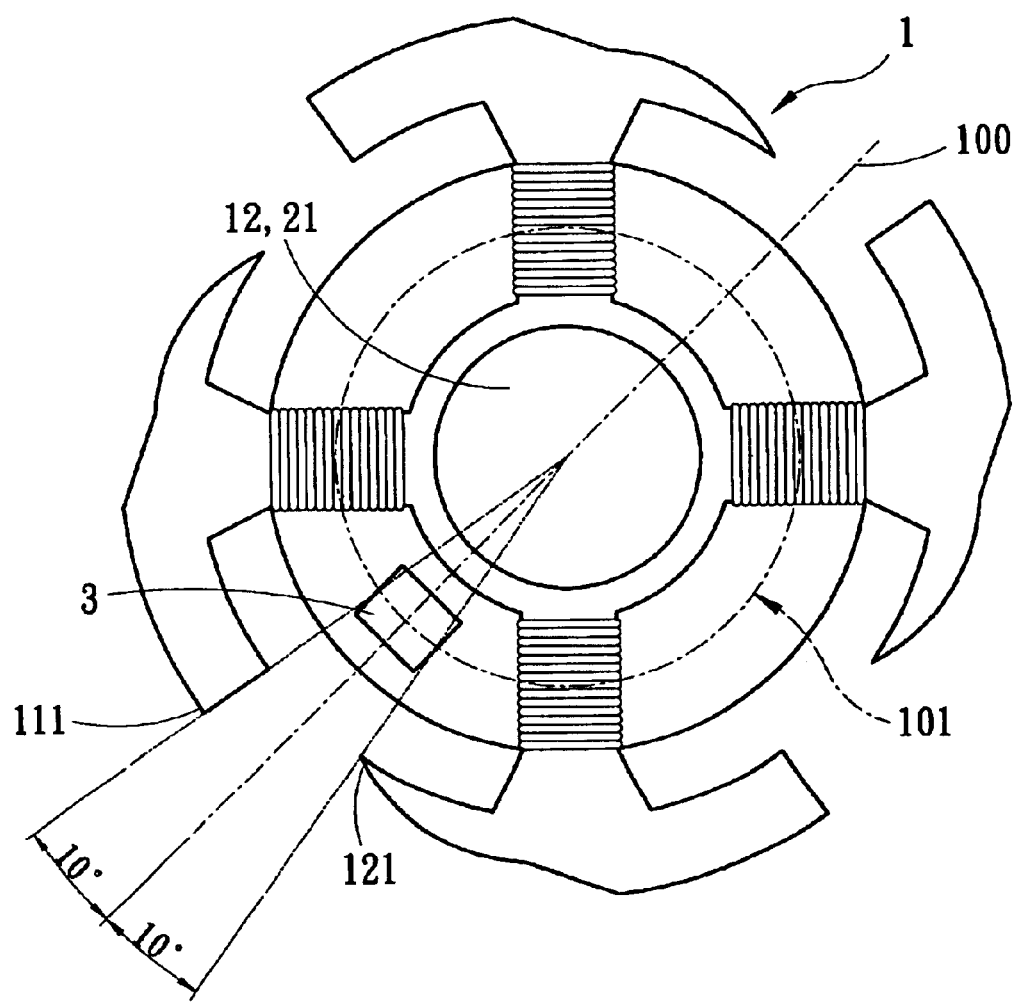
FIG. 5 is a schematic plan view of the horizontal mounting structure of FIG. 2, showing the base line of this invention.
Figure 6:
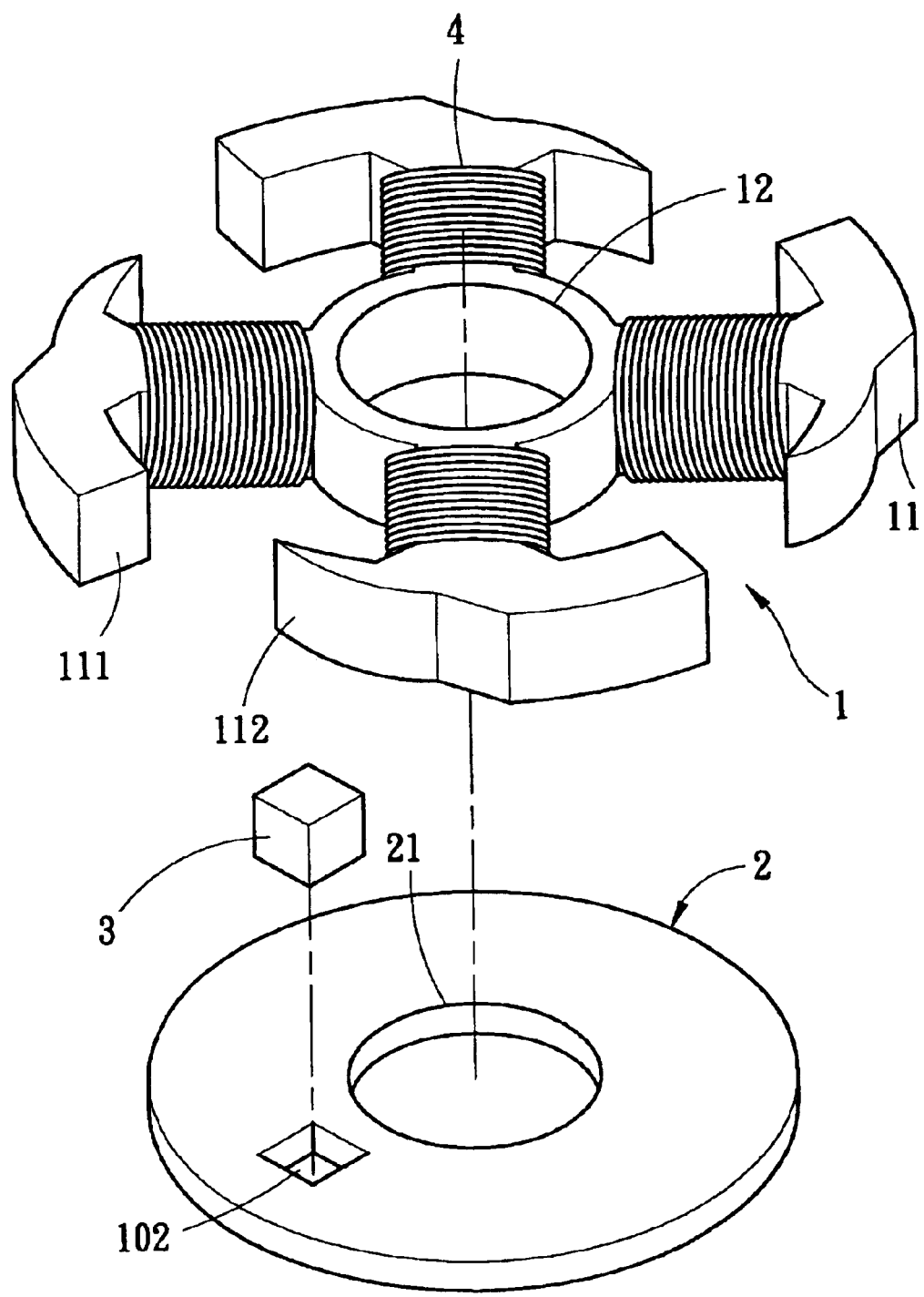
FIG. 6 is a schematic view similar to FIG. 2 showing the positioning mark.

Referring to FIGS. 1, 2, 5 and 6, the structure according to this invention mainly includes a stator 1, a circuit board 2 and an induction element 3. The induction element 3 is located at a desired position on the circuit board 2. As shown in FIG. 5, a base line 100 intersects a location for induction element 3. The position is in a zone defined by a circle 101 concentric with a center of a second shaft opening 21 of the circuit board 2 and the base line ±10 degrees (i.e. fanning forwards and rearwards from the base line for 10 degrees, for quadruple-pole stators), with the base line 100 formed by the intersection of the circuit board 2 and an equipartition plane of a front end 111 and a rear end 112 of two neighboring and opposing pole struts 11. A position mark 102 is set on the circuit board 2 for mounting the induction element 3. The position mark 102 may be a point mark or a line mark. The stator 1 has a plurality of equally spaced pole struts 11 located along the perimeter direction, and also has a first shaft opening 12 which has equal diameter as the second shaft opening 21 of the circuit board 2. The stator 1 and circuit board 2 are engaged through a shaft. The induction element 3 may be vertically mounted or horizontally mounted.

When this invention is in use, use the center of the second shaft opening 21 of the circuit board 2 as the circle center, use the equipartition plane of the opposing front end 111 and rear end 112 of two neighboring pole struts 11 to intersect with the circuit board 2 for forming a straight line as the base line, and with the positioning zone defined by the base line ±10 degrees, then make a point mark or a line mark at a position desired for mounting the induction element 3. The mark position can be made precisely, hence the induction element 3 can also be positioned precisely. As the mounting position of the induction element 3 may be adjusted within the zone defined by the circle center coincided with the center of the second shaft opening 21 of the circuit board 2, and the base line ±10 degrees (for quadruple-pole stators), with the base line defined by the equipartition plane of the front end 111 and rear end 112 of two neighboring and opposing pole struts 11 intersecting with the circuit board 2, this invention may be adapted for use in a wide range of applications.

Furthermore, the induction element 3 may be vertically mounted or horizontally mounted. The stator 1 has the first shaft opening 12 formed therein to engage with circuit board through a shaft. Hence, after the pole struts 11 of the stator are wound with coils 4, and the coils 4 are energized with electric current, the induction element 3 will be induced and activates the rotor of the air fan to rotate (not shown in the drawings).

Figure 1:
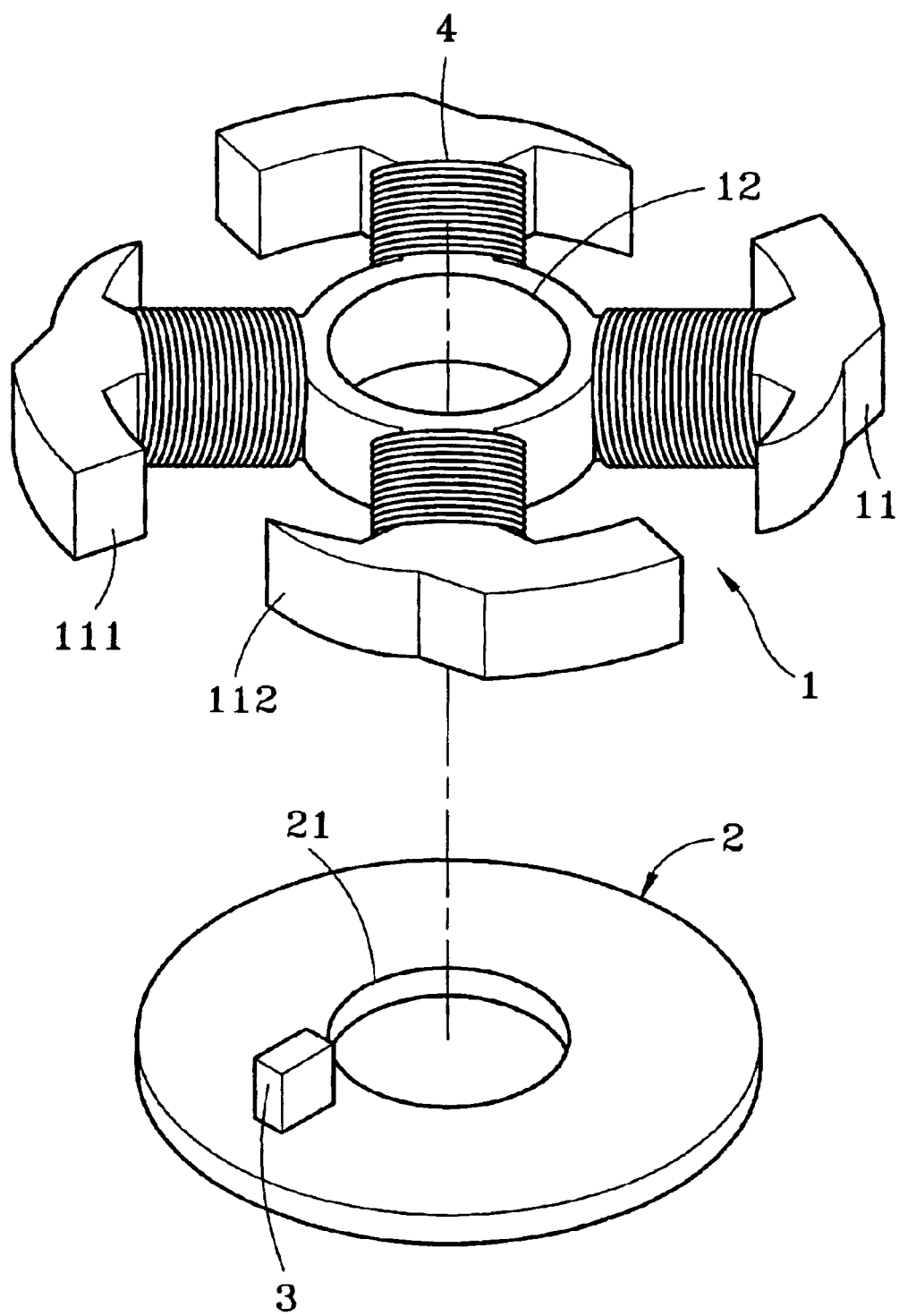
FIG. 1 is a schematic view of a vertical mounting structure of this invention.
Figure 2:
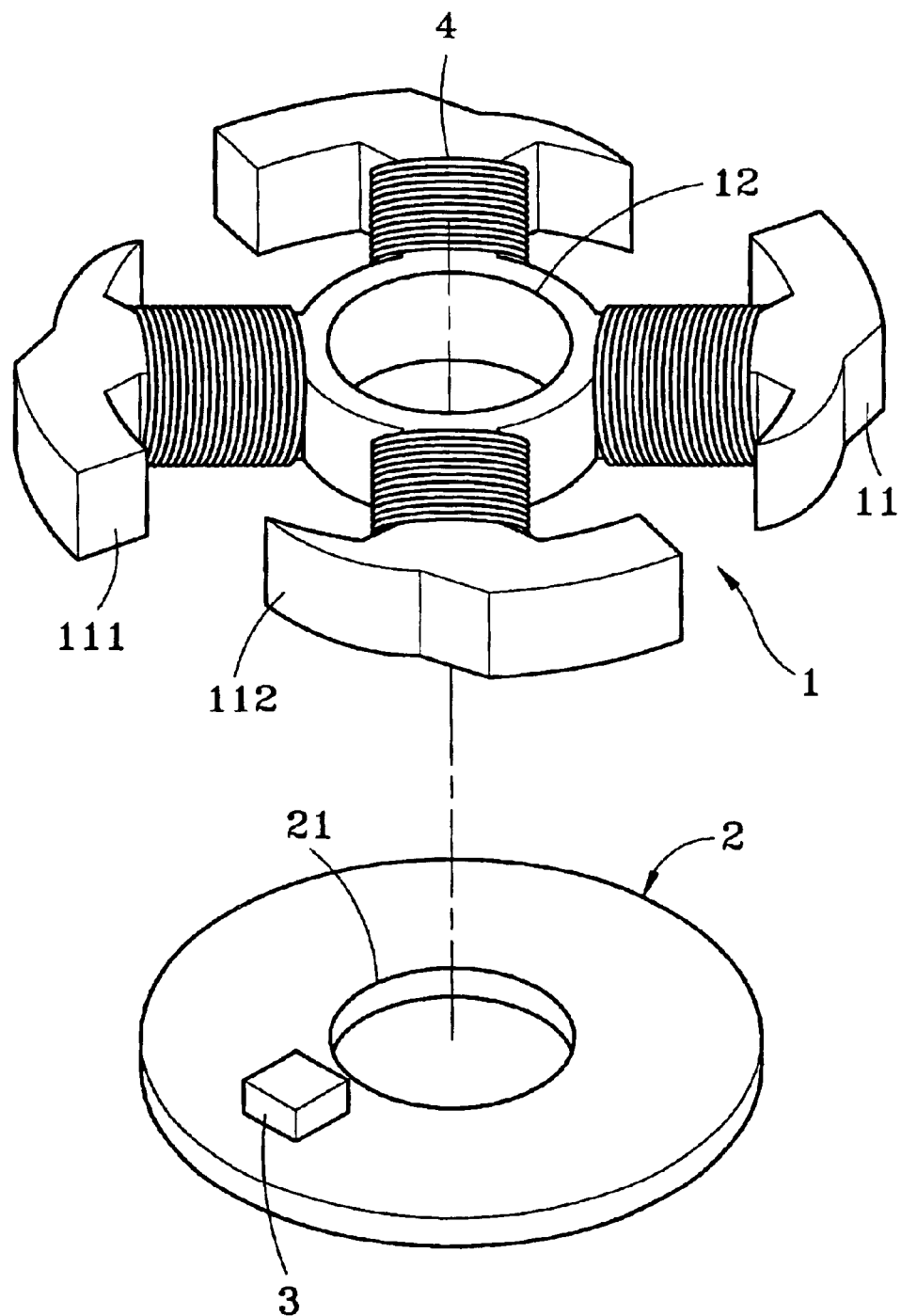
FIG. 2 is a schematic view of a horizontal mounting structure of this invention.
Figure 3:
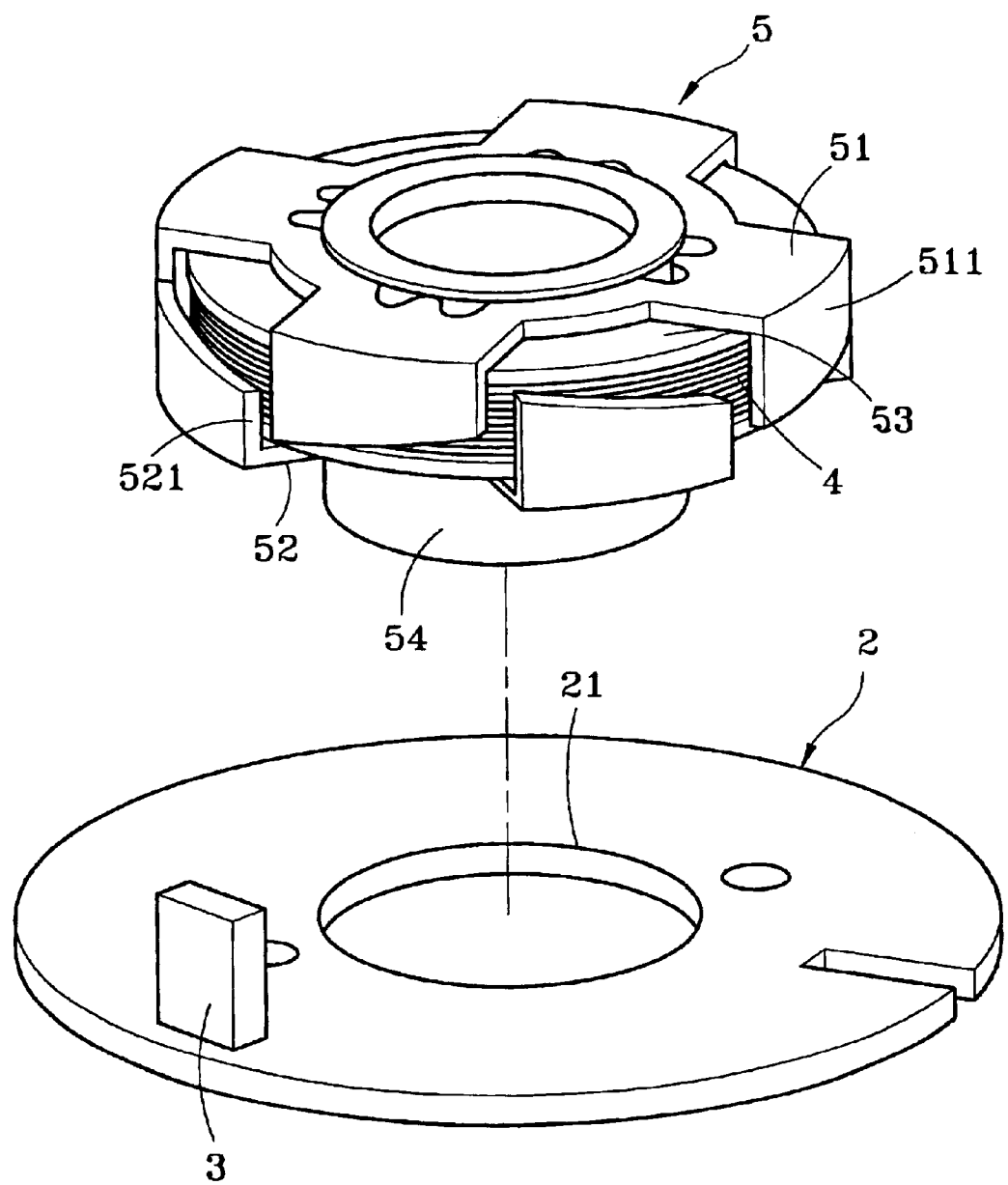
FIG. 3 is a schematic view of another vertical mounting structure of this invention.
Figure 4:
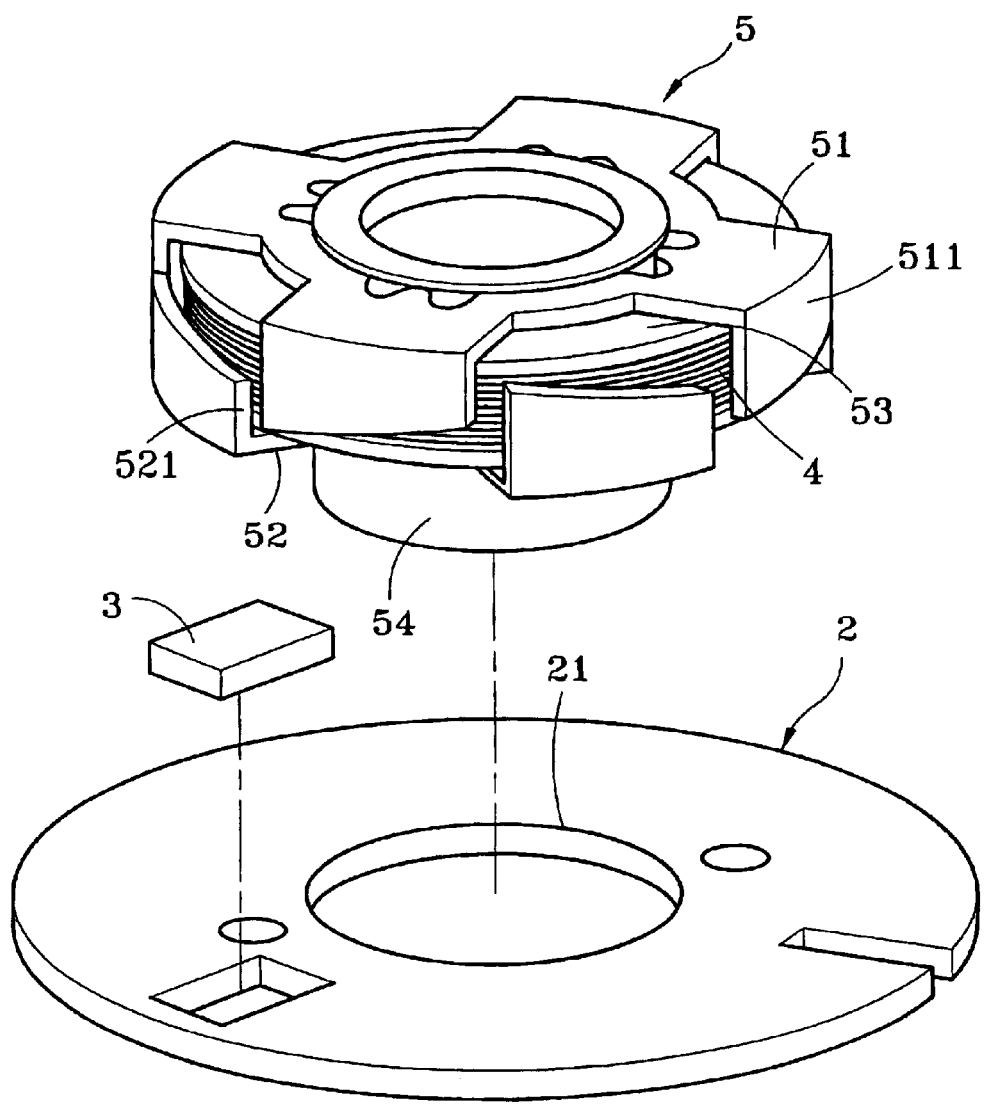
FIG. 4 is a schematic view of another horizontal mounting structure of this invention.

Referring to FIGS. 3 and 4 for another embodiment of this invention, the structure mainly includes a stator 5, a circuit board 2 and an induction element 3. The induction element 3 is located at a desired position on the circuit board 2. The position is in a zone defined by a circle center coincided with the center of a shaft opening 21 of the circuit board 2 and a base line ±5 degrees (i.e. fanning forwards and rearwards from the base line for 5 degrees, for octdrupole stators), with the base line formed by intersecting the circuit board 2 with the equipartition plane of a front pole end 511 of an upper pole sheet 51 and a rear pole end 521 of a lower pole sheet 52. A position mark is set on the circuit board 2 for mounting the induction element 3. The position mark may be a point mark or a line mark. The stator 5 has equally spaced upper pole sheets 51 and lower pole sheets 52 located along the perimeter direction, and also has a shaft sleeve 54 which has a diameter equal to the shaft opening 21 of the circuit board 2. The stator 5 and circuit board 2 are engaged through a shaft. The induction element 3 may be vertically mounted or horizontally mounted.

When this invention is in use, use the center of the shaft opening 21 of the circuit board 2 as the circle center, use the equipartition plane of the front pole end 511 of the upper pole sheet 51 and the rear pole end 521 of the lower pole sheet 52 to intersect with the circuit board 2 for forming a straight line as the base line. In the zone defined the base line ±5 degrees (for octonary-pole stators), make a point mark or a line mark at a position desired for mounting the induction element 3. The mark position can be made precisely, hence the induction element 3 can also be positioned precisely. As the mounting position of the induction element 3 may be adjusted within the zone defined by the circle center coincided with the center of the shaft opening 21 of the circuit board 2, and the base line ±5 degrees (for octonary-pole stators), with the base line defined by the equipartition plane of the front pole end 511 of the upper pole sheet 51 and the rear pole end 521 of the lower pole sheet 52 intersecting with the circuit board 2, this invention may be adapted for use in a wide range of applications.

Furthermore, the induction element 3 may be vertically mounted or horizontally mounted. The stator 5 has a shaft sleeve 54 formed therein to engage with circuit board 2 through a shaft. Hence, after the wiring frame 53 of the stator 5 is wound with a coil 4, and the coil 4 is energized with electric current, the induction element 3 will be induced and activates the rotor of the air fan to rotate (not shown in the drawings).

The construction set forth above may be adapted for quadruple-pole stators or octonary-pole stators. Through the precise positioning of the inductive element, electric current, air pressure and air flow rate and rotation speed of the air fan will be improved and air fan durability will also be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positioning structure for air fan induction element and stator, comprising:

a stator having a first shaft opening and a plurality of pole struts, one pole strut having a front end opposing a rear end of a neighboring pole strut;

a circuit board having a second shaft opening which has a diameter generally equal to the first shaft opening and engageable with the stator; and an induction element located at a selected position in a zone defined by a circle concentric with a center of the second shaft opening, and in a range defined by a base line ±10 degrees, with the base line formed by the eguipartition plane of the opposing front end and the rear end of the two neighboring pole struts intersecting with the circuit board thereby to position a quadruple-pole stator to accommodate electric current, air pressure and air flow rate and rotation speed of the air fan to enhance air fan durability.

2. The positioning structure of claim 1, wherein the mounted position of the induction element on the circuit board has a positioning mark.

3. The positioning structure of claim 2, wherein the positioning mark is a point mark or a line mark.

4. The positioning structure of claim 1, wherein the induction element is vertically mounted or horizontally mounted.

5. A positioning structure for air fan induction element and stator, comprising:

a stator having an upper pole sheet, a lower pole sheet, a shaft sleeve, and a wiring frame located between the upper pole sheet and the lower pole sheet, the upper pole sheet having a front pole end, the lower pole sheet having a rear pole end;

a circuit board having a shaft opening which has a diameter generally equal to the shaft sleeve diameter and engageable with the stator; and an induction element located at a selected position in a zone defined by a circle concentric with a center of the shaft opening, and in a range defined by a base line ±5 degrees, with the base line formed by the equipartition plane of the front pole end of the upper pole sheet and the rear pole end of the lower pole sheet intersecting with the circuit board thereby to position an octonary-pole stator to accommodate electric current, air pressure and air flow rate and rotation speed of the air fan to enhance air fan durability.

6. The positioning structure of claim 5, wherein the mounted position of the induction element on the circuit board has a positioning mark.

7. The positioning structure of claim 6, wherein the positioning mark is a point mark or a line mark.

8. The positioning structure of claim 5, wherein the induction element is vertically mounted or horizontally mounted.

* * * * *